US007735319B2

(12) United States Patent
Vukovic

(10) Patent No.: US 7,735,319 B2
(45) Date of Patent: Jun. 15, 2010

(54) POWER GENERATING APPARATUS

(76) Inventor: Marko Vukovic, I. Gundulica 51, Slakovci (HR) 32242

( * ) Notice: Subject to any disclaimer, the term of this patent is extended or adjusted under 35 U.S.C. 154(b) by 209 days.

(21) Appl. No.: 12/117,337

(22) Filed: May 8, 2008

(65) Prior Publication Data

US 2008/0295510 A1    Dec. 4, 2008

Related U.S. Application Data

(60) Provisional application No. 60/917,708, filed on May 14, 2007.

(51) Int. Cl.
*F03C 1/00* (2006.01)

(52) U.S. Cl. .............................. 60/500; 60/504; 60/505; 60/506; 60/507

(58) Field of Classification Search .................... 60/495, 60/497, 500, 504–507
See application file for complete search history.

(56) References Cited

U.S. PATENT DOCUMENTS

| | | | | |
|---|---|---|---|---|
| 3,965,365 A | * | 6/1976 | Parr | 290/53 |
| 4,206,601 A | * | 6/1980 | Eberle | 60/398 |
| 4,249,639 A | | 2/1981 | Vukovic | |
| 5,424,582 A | * | 6/1995 | Trepl et al. | 290/53 |
| 6,681,572 B2 | * | 1/2004 | Flory | 60/507 |
| 6,711,897 B2 | * | 3/2004 | Lee | 60/507 |

* cited by examiner

*Primary Examiner*—Hoang M Nguyen
(74) *Attorney, Agent, or Firm*—Richard M. Goldberg

(57) ABSTRACT

Power generating apparatus includes a float mounted on a support pivotally mounted to a base and secured to a beam extending rearwardly of the base to a vertically extending elongated structure carrying a pair of vertically movable gear racks in guideways. Each rack is engaged by a gear wheel driven by movement of the racks and a one-way drive arrangement connects each gear wheel to an output shaft. Driving weights are secured to each rack to drive the racks in opposite directions under the action of gravity forces acting on the weights, thus causing the output shaft to rotate in a given direction. The free end of the beam is connected to a cross-arm vertically moveable on a guide on the elongate structure, the cross-arm having a motion transmitting arrangement to raise each weight during vertical movement of the cross-arm resulting from movement of the float.

4 Claims, 6 Drawing Sheets

POWER GENERATING APPARATUS

INTRODUCTION TO THE INVENTION

This invention relates to improvements in power generating apparatus and relates particularly to improvements in apparatus for generating power utilizing wave motion in open bodies of water.

BACKGROUND TO THE INVENTION

A number of proposals have been made for the utilization of wave and/or tidal power for generation of electrical power. Such prior proposals generally include generating apparatus which utilize float means moveable by the wave motion on an open body of water. The movement of the float means is then translated into electrical energy by appropriate mechanical apparatus arranged to drive power generating apparatus. The present invention is directed to an improved form of apparatus based on particular improvements to the disclosure in U.S. Pat. No. 4,249,639 for utilizing the potential energy in water movement, and particularly wave motion, to generate electrical power.

OBJECTS OF THE INVENTION

It is an object of the invention to provide apparatus which is relatively economical to construct and erect and which is able to utilize the wave motion for electrical power generation, including both vertical and horizontal wave motion.

A further object of the present invention is to provide apparatus which is adapted to utilize the motion of all wave forms in the sea or other open bodies of water and to translate the potential energy in such wave motion into electrical power.

A still further object of the present invention is to provide apparatus which can utilize wave motion which varies in frequency and amplitude and direction.

SUMMARY OF THE INVENTION

According to the invention there is provided apparatus for generating electrical power utilizing the motion of waves on an open body of water comprising:

(a) an elongate support structure extending vertically upwards from a base relatively fixed with respect to said body of water, (b) guide arrangement on said support structure for at least two vertically moveable gear racks and a vertically moveable cross-arm engaged with each rack, (c) motion transmitting arrangement on the cross-arm to move a first one of said gear racks during upward movement of the cross-arm and to move a second of said gear racks during downward movement of the cross-arm, (d) at least one gear wheel engaged with each gear rack, each gear wheel drivingly connected to a first output shaft through one-way motion transmitting arrangement whereby the motion of each gear rack in one direction only drivingly rotates said output shaft, (e) a first driving mass fixed to said first one of said gear racks to drive the gear rack downward under the action of gravity, (f) a second driving mass secured by a cable passing around a pulley on the support structure to said second of said gear racks to drive the said second gear rack upwardly under the action of gravitational forces on said second mass, (g) a float positioned on said body of water and horizontally spaced from the support structure, said float having a shape and configuration whereby the wave motion causes the float to move vertically relative to said base, (h) a support for said float pivotally mounted to a pivot support fixed relative to said base and between said float and said support structure, (i) a beam pivotally mounted at one end to said pivot support and extending towards said support structure, said beam being adjustably secured to said support for movement therewith in the vertical plane, (j) a connecting arm pivoted at one end to the free end of said beam and extending generally, upwardly therefrom to said cross-arm, whereby vertical movement of said float reciprocating drives said cross-arm vertically on its associated guide, wherein said float includes a plurality of float members supported on an axle for rotation responsive to said wave motion wherein said rotational movement is transmitted to a second output shaft through a one way motion transmitting arrangement, and (k) a device for combining the output of said first and said second output shafts and transmitting same to said flywheel.

The invention has for its main object to convert the energy in wave motion to a form which is directly usable to generate power. To this end the apparatus of the invention uses the vertical movement of the float to raise the driving masses towards the top of the support structure means. One driving mass is raised during upward movement of the float and the other driving mass is raised during downward movement of the float. The driving masses descend under the action of gravity and drivingly rotate the output shaft through movement of the associated gear racks, gear wheels and one-way motion transmitting means. In addition, the particular improvements to the apparatus of the current invention utilise the horizontal wave movement where individually mounted float members are mounted for rotation about an axle so as to utilise horizontal movement of wave formations wherein the rotational movement is translated via a float drive shaft to a secondary drive wheel which contributes the horizontal aspect of wave movement into the generation power by the apparatus of the invention.

Referring now to the particular improvements and modifications provided in the current apparatus, the support structure 14 is provided with a modified float 12, comprising a plurality of float members 50 configured for free rotation about a float axis 52. The independent float members act in the same manner and capacity as the principal float 12 previously described so as to utilise vertical motion of the waves. In addition, the float members can also utilise horizontal movement of the waves by rotating around the float axis 52. The combined motion of the float is therefore able to utilise all aspects of wave movement to improve the efficiency and generation of electricity over and above that previously described with respect to the prior art apparatus disclosed in U.S. Pat. No. 4,249,639.

The plurality of float members 50 are adapted to respond to horizontal wave motion by rotating in either direction, dependent on the motion of the waves. The 20 rotational movement is transmitted via a float drive shaft 56, along the length of the support structure 14 and beams 17 to a secondary drive wheel 48. The secondary drive will 48 is connected to a second output shaft 47. The second output shaft incorporates a one way motion transmitting means so as to translate the clockwise and/or anti-clockwise movement of the float members into a consistent motion of the secondary drive wheel 48.

A secondary drive wheel 48 includes means to transfer the rotational movement to the float wheel 12 by way of a mechanism combining the output forces of the secondary output shaft 47 with the first output shaft 32. The combined rotational movements of the first and second output shafts act in concert to apply a drive force of float wheel 12 which in turn can be used for the generation of electricity.

The mechanicals of the improved apparatus allow for the independent or combined application of vertical and horizontal wave movements into a combination of vertical and rotational movement of the float 12 which in turn can be independently or in combination translated into rotational, mechanical power at the first and second output shafts which finally can be combined for driving the float wheel 12.

A large flywheel is preferably mounted on or connected to the first and second output shafts, and a generator of appropriate power output is driven by suitable drive-belts or gearing from the output shaft.

The invention will be more clearly understood from the following description of one embodiment of the apparatus taken in conjunction with the accompanying drawings.

LEGEND

Figure 1:
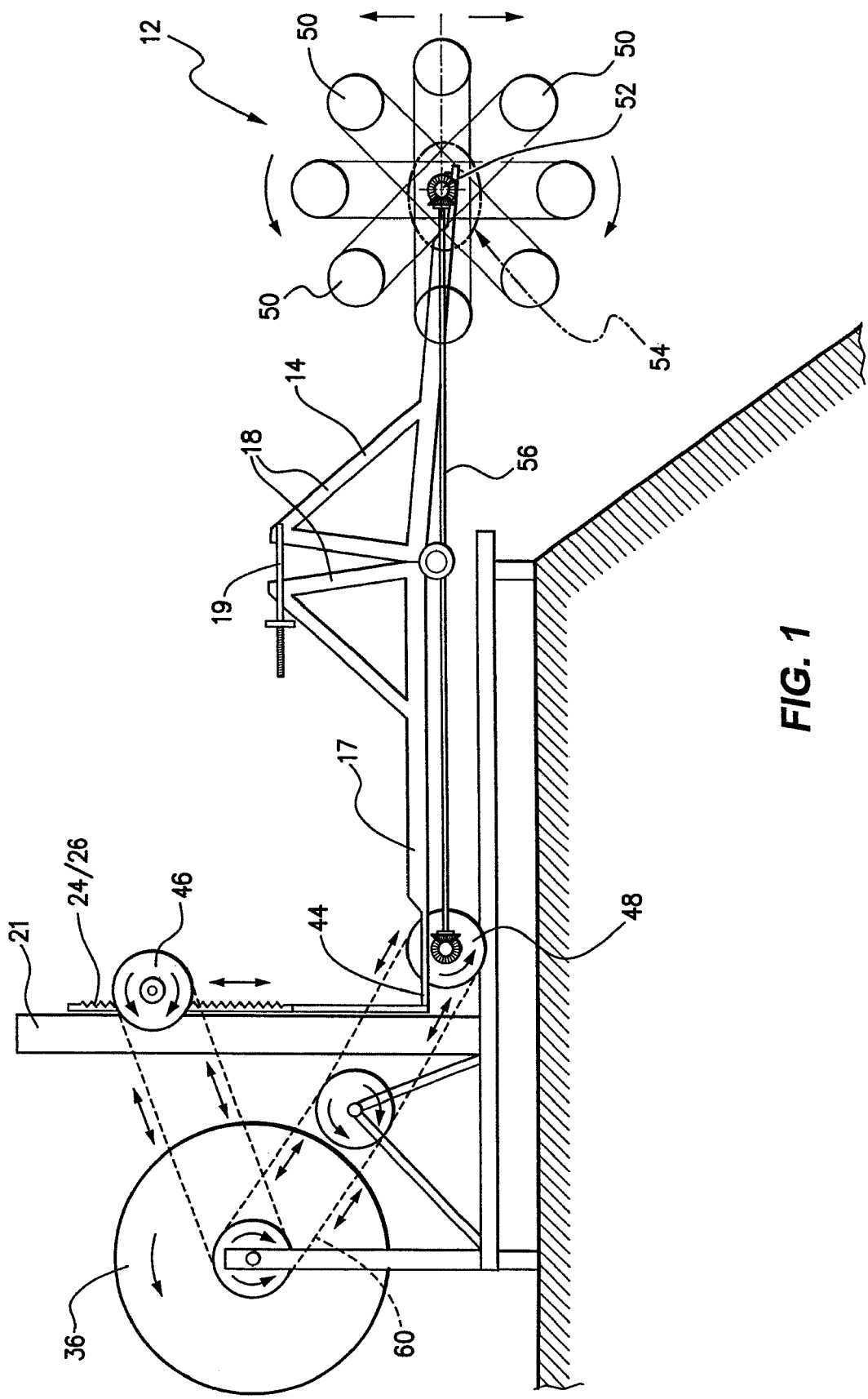
FIG. 1 is a side elevation of the improved apparatus.
Figure 2:
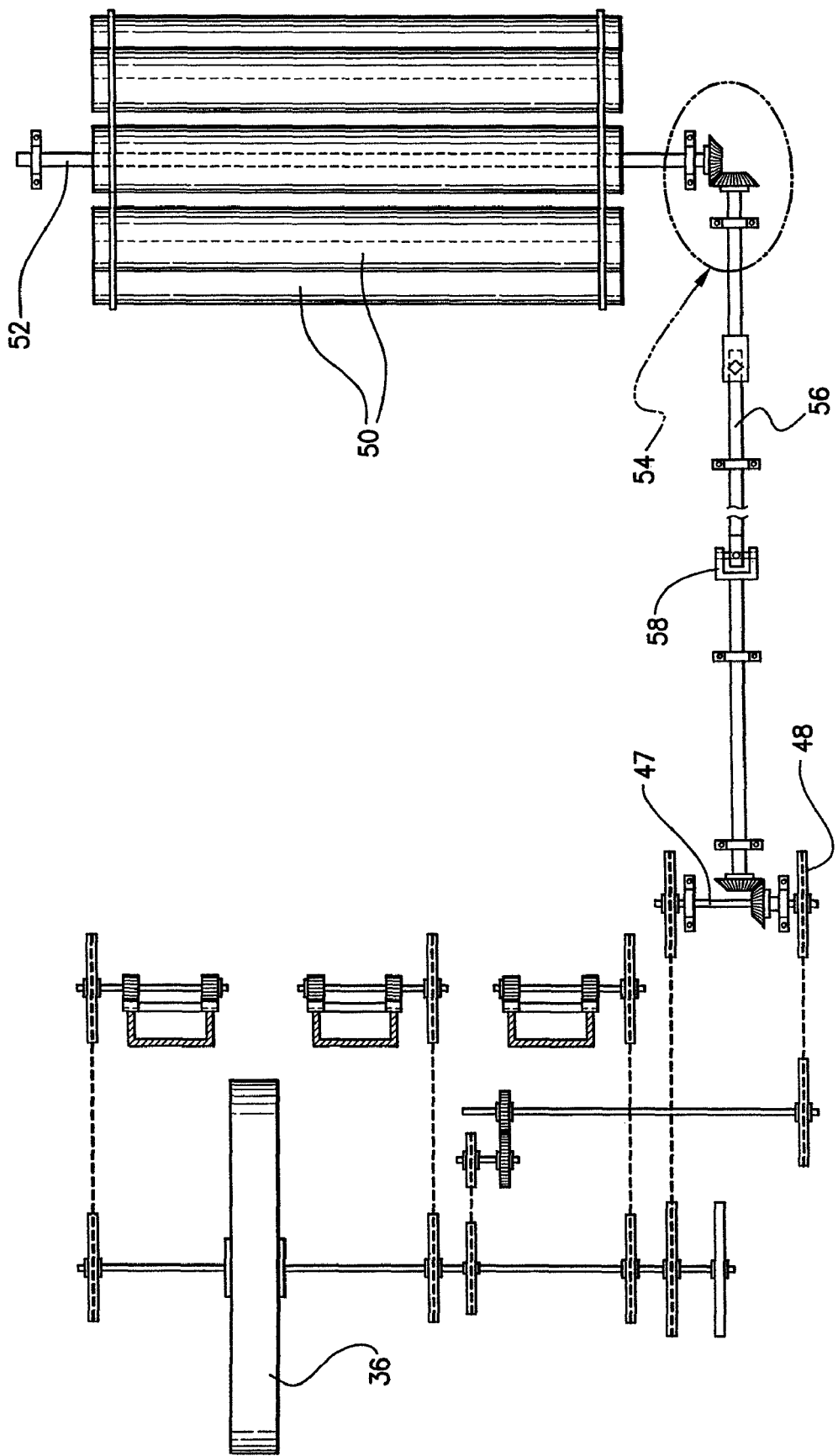
FIG. 2 is a plan view of the apparatus drive chain.
Figure 3:
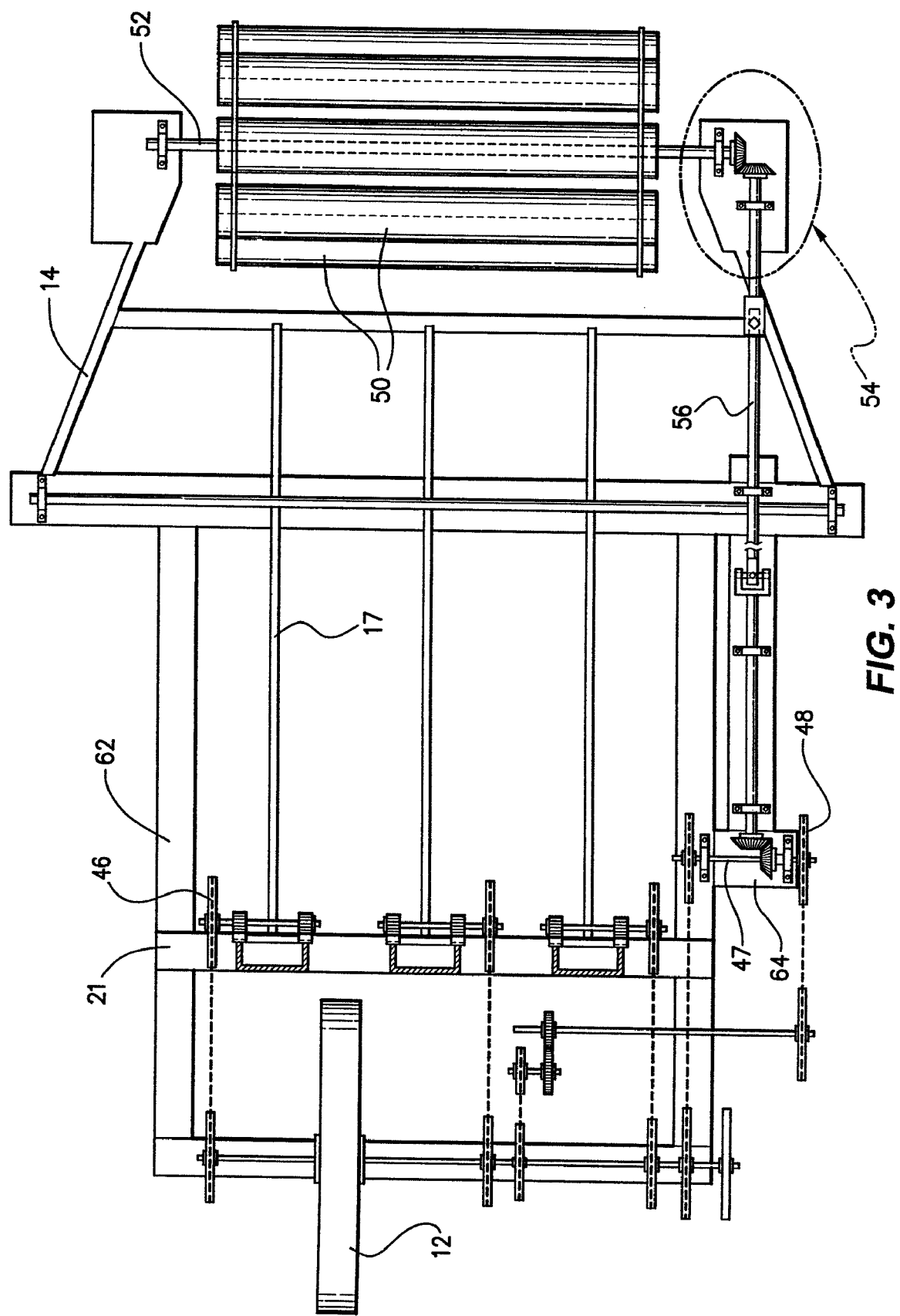
FIG. 3 is a plan view including the structural elements.
Figure 4:
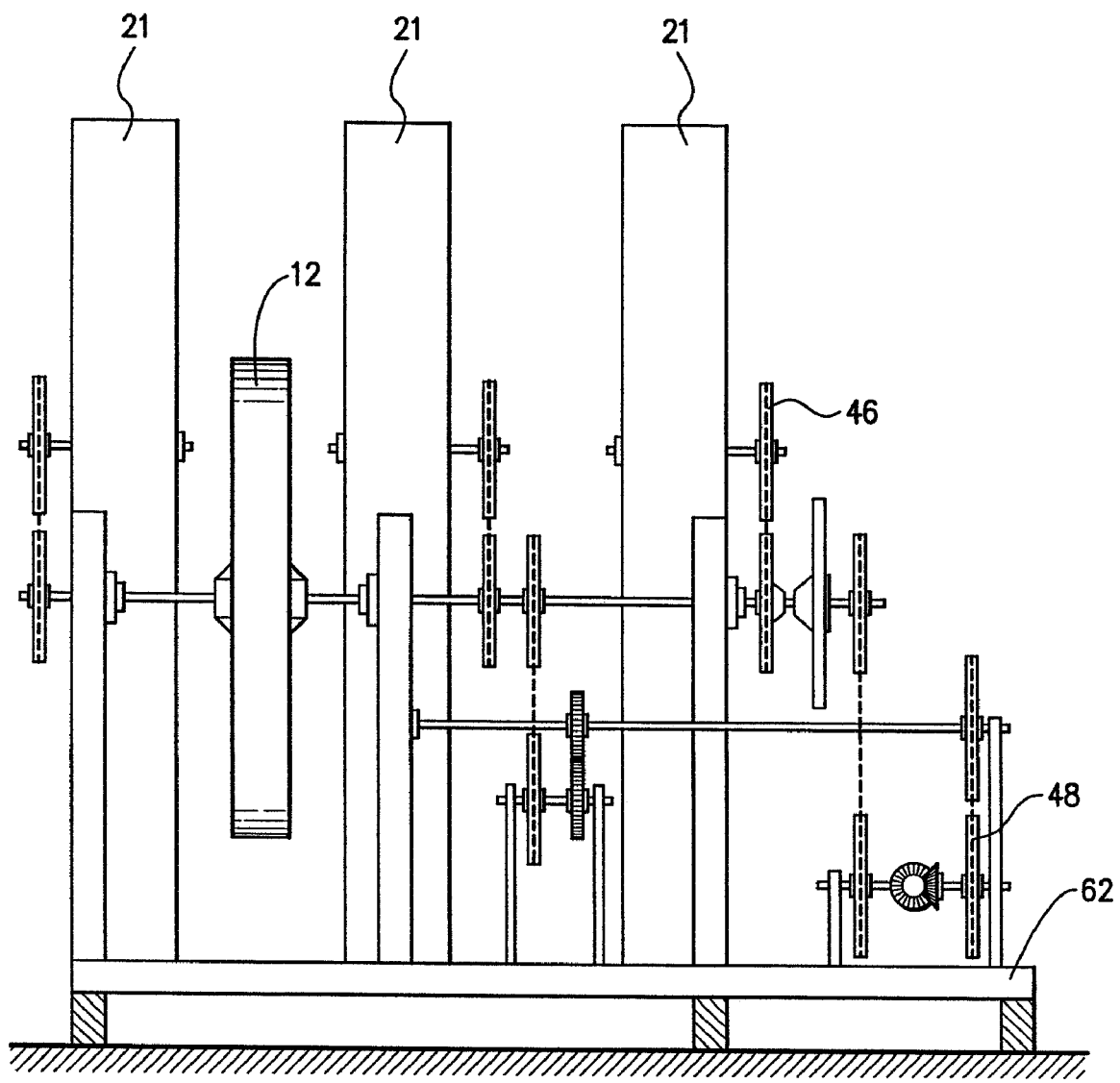
FIG. 4 is an end view of the apparatus.
Figure 5:
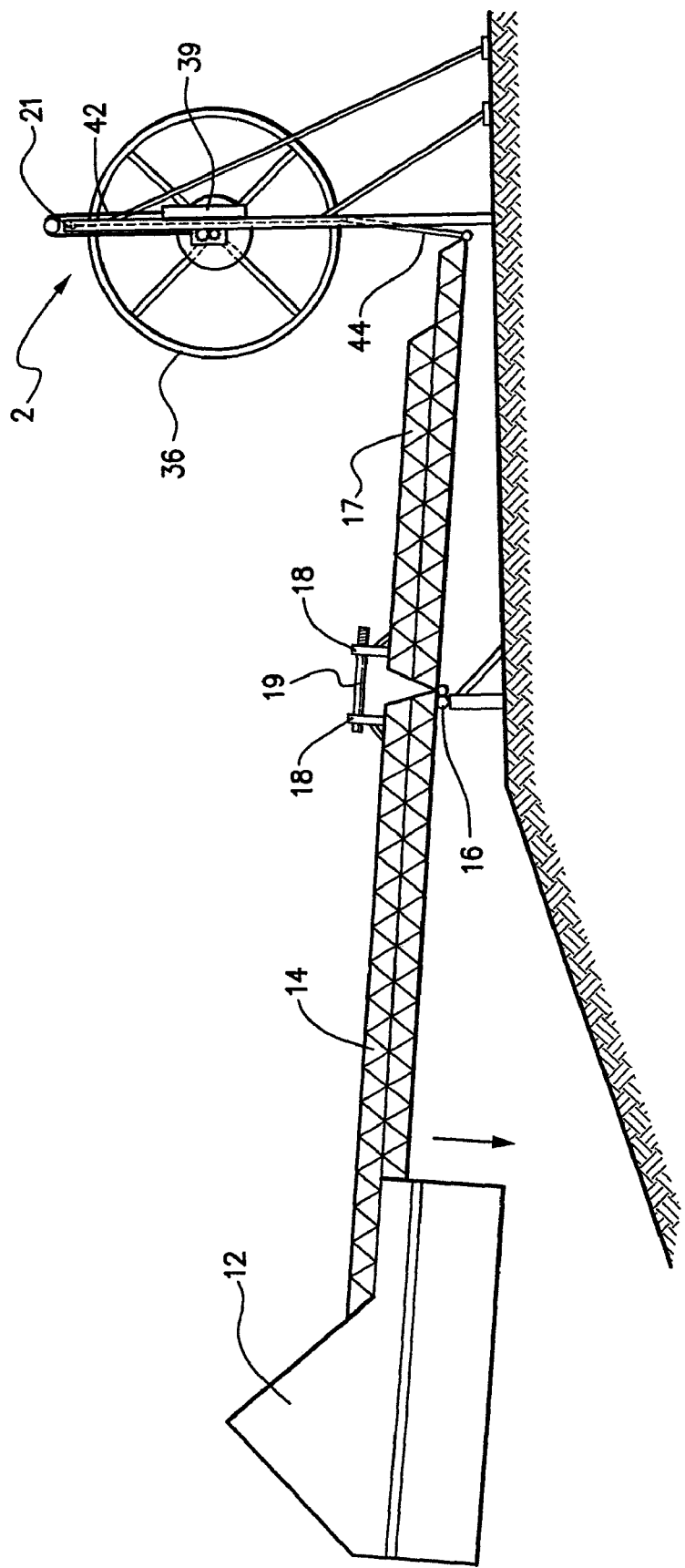
FIG. 5 is a side elevational view of the prior art embodiment of the power generating apparatus
Figure 6:
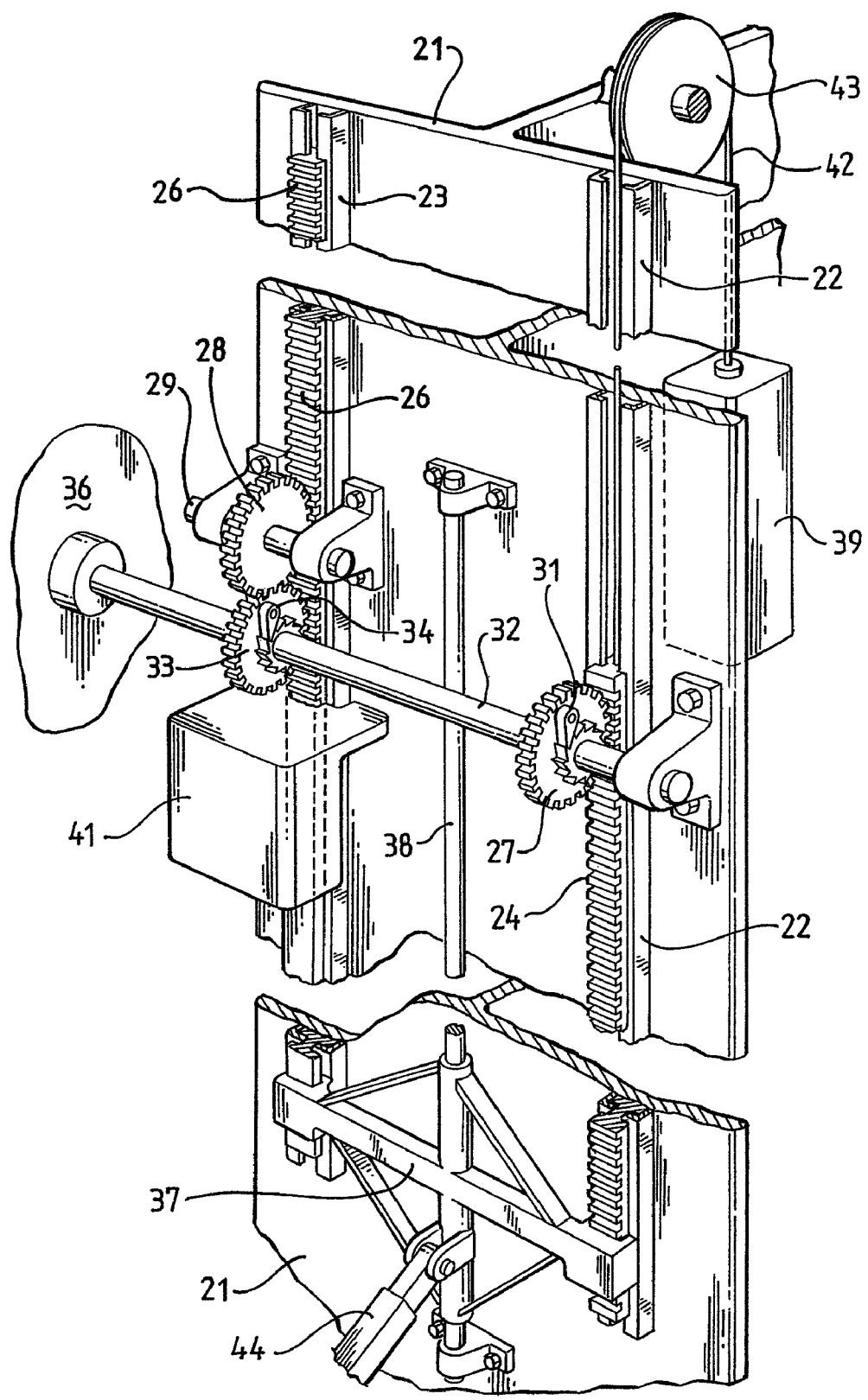
FIG. 6 is a diagrammatic perspective view of the motion translation portion of the prior art apparatus.

12. Float
13.
14. Support structure
15.
16. Pivot
17. Beam
18. Lugs
19. Spacer
20.
21. Support
22. Guide Way
23. Guide Way
24. Rack
25.
26. Rack
27.
28. Gear
29. Shaft
30.
31. Ratchet
32. First output shaft
33. Second gear
34. Second ratchet
35.
36. Fly wheel
37. Cross arm
38.
39. Mass
40.
41. Mass
42. Wire
43. Pillar
44. Connecting arm
45.
46. Primary drive wheel
47. Second output shaft
48. Secondary drive wheel
49.
50. Float members
51.
52. Float axle
53.
54. Float gearbox
55.
56. Float drive shaft
57.
58. Universal joint
59.
60. Transmission belt
61.
62. Frame
63.
64. One way motion transmitting gearbox

DESCRIPTION OF THE PREFERRED EMBODIMENT

Referring to the drawings, there is provided power generating apparatus which comprises a float 12 constructed to be positioned on a body of water in a location so as to be subjected to wave motion. The location of the float 12 may be in an ocean adjacent the shore, or adjacent a substantially rigid structure over the water so that relative movement occurs between the float and its support due to wave motion.

Preferably, the float 12 is of substantially rectangular or trapezoid shape with an upwardly inclined forward edge portion which extends towards the direction of advance of the prevailing wave motion. The optimum shape, size and weight of the float may be experimentally determined to ensure maximum degree of movement of the float in response to wave movement.

The float 12 is mounted on one end of a support structure 14 pivoted at its other end on a pivot support 16 which is immovably fixed to a base mounted either on shore or on a relatively fixed rigid structure. For the purposes of this specification the invention will be described with the apparatus located on land and the float in sea water at a location where wave motion is substantially constant.

The wave motion acts on the float 12 to cause vertical movement thereof which results in arcuate movement of the support 14 about the pivot 16.

A beam-like structure 17 extends rearwardly of the pivot support 16 and is adjustably secured to the forwardly extending support structure 14 by means of rigid lugs 18 and spacer bars 19, shown diagrammatically in FIG. 1. With this arrangement, at any particular time, the optimum position of the float 12 in relation to the pivot 16 and the power generating apparatus may be selected.

The power generating apparatus which is operated by the vertical movement of the float comprises a vertical elongate support structure 21 immovably fixed in position. The structure 21 carries vertically extending guideways 22 and 23 guiding and supporting a pair of spaced gear racks 24 and 26 which are adapted to move vertically in the respective guideways 22 and 23. Each gear rack 24 and 26 is engaged by a gear wheel 27 and 28, mounted for rotation on shafts 32 and 29 on movement of the respective racks. The gear wheel 27 is connected through a ratchet mechanism 31 to the output shaft 32, and gear wheel 28 drives a second gear 33 which is connected through a second ratchet mechanism 34 to the output shaft 32.

A flywheel 36 mounted on the output shaft 32 drives a generator (not shown) for generation of electrical power on rotation of the fly wheel 36.

Each ratchet mechanism 31 and 34 is arranged so that the movement of the respective racks 24 and 26 in opposite directions will rotate the flywheel 36 and reverse movements of the respective racks will result in slip of the ratchet mechanism. In other words, movement of the rack 24 vertically upwards will cause a driving motion to be transmitted to the flywheel 36 and vertical movement downwards of the other rack 26 will also drive the flywheel 36 in the same direction.

Each rack 24 and 26 is moved vertically on its associated guideway by means of a cross-arm 37, which itself is guided for movement parallel to the gear rack guideways by a suitable guide post 38. The cross-arm 37 is provided with releasable connecting means which are known per se and not illustrated in detail comprising spring biased wedges, ball detents, ball and ramp wedging means or other suitable releasable connecting means which enables the cross-arm 37 to grip and raise the gear rack 26 when the cross-arm is moved vertically upwards and to release that rack 26 and grip and move the other rack 24 downwards when the cross-arm 37 is moved vertically downwards.

It will therefore be seen that the arrangement of the cross-arm and the racks is such that reciprocating vertical movement of the cross-arm moves one rack to an elevated position and moves the other rack to a lowered position on the column.

Each gear rack 24 and 26 is connected to a driving mass 39 and 41, the gear rack 26 which is raised by the cross-arm 37 to the elevated position being directly connected to the mass 41 so that the mass tends to move that rack downwardly, and the other gear rack 24 being connected to the mass 39 via a cord or steel wire 42 passing from the top of the gear rack 24 over a pulley 43 mounted on the top of the support structure.

In operation of the apparatus, the cross-arm 37 is connected to the free end of the beam-like structure 17 by means of a connecting arm 44.

As the float 12 is moved vertically by action of waves acting upon it, the free end of the rearwardly extending beam-like structure 17 moves vertically a distance determined by the vertical distance moved by the float 12 and the ratio of the distance between the free end of the structure 17 and the pivot support 16 and the distance between the pivot support 16 and the float 12.

Vertical movement of the end of the structure 17 is transmitted to the cross-arm 37 by the connecting arm 44 so that the cross-arm is also moved vertically along its guide post 38.

Each time the cross-arm 37 is elevated the releasable connecting means engages with the gear rack 26 and moves that rack vertically. At this time the connecting means is automatically released from connection with the other gear rack 24 so the cross-arm 37 simply slides along that rack without imparting a vertical motion thereto.

As the cross-arm 37 begins to descend in response to the float 12 being raised by wave motion, the releasable connecting means engages the cross-arm 37 to the gear rack 24 to move that rack vertically downwards, thus raising the mass 39. At this time, the gear rack 26 is released from connection with the cross-arm 37 and is able to descend along its guideway under the action of the driving mass 41.

Therefore, the operation of the cross-arm 37 is alternately moving one or other gear racks to their uppermost position. When the gear racks are released from connection with the cross-arm 37 the masses act to move the respective racks thereby rotating the associated gear wheels and the fly wheel 36.

The particular improvements provided by the current invention are specifically exemplified with modifications to the float 12 which take the form of a plurality of individual float members 50 formed in a generally circular configuration and linked together for rotation about a pivot point 52, which takes the form of a float axle. The individual float members are adapted for free movement in either direction about the float axle 52 such that they can be responsive to horizontal wave motions in a clockwise or anticlockwise direction. The rotational movement of the float members 50, provides the additional dimension of motion, in addition to the vertical motion previously described. The rotational movement of the float members 50 is harnessed by float gearbox 54 which translates the rotational movement to the float drive shaft 56 which is configured to transmit the rotation of movement along the length of the support structure 14 and beam 17 to a one-way motion transmitting gearbox 64, positioned in proximity to the general frame 62 and support members 21 of the apparatus. The one-way motion transmitting gearbox 64 is configured to transmit the rotational movement of the driveshaft 56 into a one-way motion of the secondary drive wheel 48, such that the clockwise or anticlockwise movement of the float members 50, responsive to horizontal movement in waves is transferred to a single rotary action of a secondary drive wheel 48. In this manner, the secondary drive wheel 48 is able to provide additional energy input into the apparatus for use in conjunction with the energy input provided by a drive wheel 46. The rotational energy provided by the secondary drive wheel 48 is then transmitted to the fly wheel 36 by way of a suitable arrangement of pulleys or belts. The fly wheel 36 is remotely located from the support 21 and is also fed by a suitable belt or chain transmission from the primary drive wheel 46.

In this manner, the combined vertical and horizontal wave motions can now be fully utilised by all the mechanical aspects of the apparatus and the combined motions fed into the fly wheel 36, so as to provide the full driving power to fly wheel from all the wave motions available to the apparatus.

As previously stated, the fly wheel 36 is connected to an electrical generating system (not shown) to generate electricity as a result of the downwardly moving masses. The vertical and horizontal movement of the waves acting on the floats 12 is thereby converted into electrical energy.

The structure of this invention ensures that the fly wheel 36 is not directly driven by motion from the float but is driven by the action of the falling masses associated with each of the moveable racks, and the associated action of the rotating float members.

The structure of the invention may be mounted adjacent the shore or, alternatively, may be mounted on a platform erected some distance from the shore in order to take advantage of somewhat larger waves developed in offshore locations. Power from the electrical generators may then be transmitted via undersea cables.

It will also be appreciated that a plurality of mechanisms in accordance with the invention may be located close together (or spread over some distance), each generating system operating independently and feeding power into a common electrical grid.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. Apparatus for generating electrical power utilizing the motion of waves on an open body of water comprising:
    (a) an elongate support structure extending vertically upwards from a base relatively fixed with respect to the body of water,
    (b) guide arrangement on said support structure for at least two vertically moveable gear racks and a vertically moveable cross-arm engaged with each rack,
    (c) a motion transmitting arrangement on the cross-arm to move a first one of said gear racks during upward movement of the cross-arm and to move a second of said gear racks during downward movement of the cross-arm,
    (d) at least one gear wheel engaged with each gear rack, each gear wheel drivingly connected to a first output shaft through a one-way motion transmitting arrangement whereby motion of each gear rack in one direction only drivingly rotates said output shaft,
    (e) a first driving mass fixed to said first one of said gear racks to drive the gear rack downward under the action of gravity,
    (f) a second driving mass secured by a cable passing around a pulley on the support structure to said second of said gear racks to drive the said second gear rack upwardly under the action of gravitational forces on said second mass,
    (g) a float positioned on the body of water and horizontally spaced from the support structure, said float having a shape and configuration whereby the wave motion causes the float to move vertically relative to said base,
    (h) a support for said float pivotally mounted to a pivot support fixed relative to said base and between said float and said support structure,
    (i) a beam pivotally mounted at one end to said pivot support and extending towards said support structure, said beam being adjustably secured to said support for movement therewith in a vertical plane,
    (j) a connecting arm pivoted at one end to a free end of said beam and extending generally, upwardly therefrom to said cross-arm, whereby vertical movement of said float reciprocating drives said cross-arm vertically on said guide arrangement, wherein said float includes a plurality of float members supported on an axle for rotation responsive to the wave motion wherein rotational movement of the float members is transmitted to a second output shaft through a one way motion transmitting arrangement, and
    (k) a device for combining an output of said first and said second output shafts and transmitting the same to a flywheel.

2. An apparatus according to claim 1 wherein said pivot support is positioned midway between said float and said support structure.

3. An apparatus according to claim 1 wherein said beam is secured to said float to permit variation in an angle of inclination of said beam relative to said support.

4. An apparatus according to claim 1 wherein said motion transmitting arrangement includes a drive wheel fixed to said first output shaft and a pawl engaging teeth on said drive wheel.

* * * * *